(12) United States Patent
Akkur et al.

(10) Patent No.: US 11,232,833 B2
(45) Date of Patent: Jan. 25, 2022

(54) DUMMY BITLINE CIRCUITRY

(71) Applicant: ARM Limited, Cambridge (GB)

(72) Inventors: Abhishek B. Akkur, San Jose, CA (US); Jitendra Dasani, Cupertino, CA (US); Shri Sagar Dwivedi, San Jose, CA (US); Vivek Nautiyal, Milpitas, CA (US); Satinderjit Singh, Fremont, CA (US); Vasimraja Bhavikatti, San Jose, CA (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 15/679,325

(22) Filed: Aug. 17, 2017

(65) Prior Publication Data

US 2019/0057735 A1    Feb. 21, 2019

(51) Int. Cl.
| | |
|---|---|
| G11C 11/419 | (2006.01) |
| H01L 23/528 | (2006.01) |
| H01L 27/11 | (2006.01) |
| G11C 7/22 | (2006.01) |
| G06F 30/35 | (2020.01) |
| G06F 30/392 | (2020.01) |
| G06F 30/394 | (2020.01) |
| G11C 7/12 | (2006.01) |
| G11C 7/08 | (2006.01) |
| G06F 119/12 | (2020.01) |

(52) U.S. Cl.
CPC ............ *G11C 11/419* (2013.01); *G06F 30/35* (2020.01); *G06F 30/392* (2020.01); *G06F 30/394* (2020.01); *G11C 7/227* (2013.01); *H01L 23/5286* (2013.01); *H01L 27/1104* (2013.01); *H01L 27/1116* (2013.01); *G06F 2119/12* (2020.01); *G11C 7/08* (2013.01); *G11C 7/12* (2013.01)

(58) Field of Classification Search
CPC .................................................... G11C 11/419
USPC .......................................................... 365/154
See application file for complete search history.

(56) References Cited

U.S. PATENT DOCUMENTS

| | | | | |
|---|---|---|---|---|
| 4,939,693 A | * | 7/1990 | Tran ...................... | G11C 11/419 365/190 |
| 2010/0118628 A1 | * | 5/2010 | Wang ....................... | G11C 8/08 365/194 |
| 2012/0257464 A1 | * | 10/2012 | Moriwaki ............. | G11C 11/419 365/189.11 |
| 2013/0258760 A1 | * | 10/2013 | Hold ....................... | G11C 11/412 365/154 |
| 2014/0010032 A1 | * | 1/2014 | Seshadri .................. | G11C 7/12 365/203 |
| 2015/0049563 A1 | * | 2/2015 | Maiti ..................... | G11C 5/148 365/194 |

* cited by examiner

*Primary Examiner* — Alfredo Bermudez Lozada
(74) *Attorney, Agent, or Firm* — Pramudji Law Group PLLC; Ari Pramudji

(57) ABSTRACT

A circuit includes a dummy wordline, a dummy bitline, and a dummy cell coupled to the dummy bitline. The dummy cell includes an active pulldown nMOSFET and a pass nMOSFET having a gate connected to the dummy wordline, a first source terminal connected to the drain terminal of the active pulldown nMOSFET, and a drain terminal connected to the dummy bitline. The circuit further includes a substrate-connected dummy bitline coupled to the source terminal of each active pulldown nMOSFET and coupled to a substrate.

26 Claims, 4 Drawing Sheets

DUMMY BITLINE CIRCUITRY

BACKGROUND

A self-timing path (or circuit) is a significant component of a memory device, such as an SRAM (Static Random Access Memory), and helps provide reliable, high-speed read or write operations. A self-timing path is used to control the pulse width of an internal clock signal within the memory device, which in turn controls sense amplifiers and latches for reading or writing to a bitcell array within the memory device. By tracking column and row performance of a bitcell array, the appropriate latches and sense amplifiers can be enabled at the correct time during the read or write operation to facilitate a reliable read or write operation. Improvement in column and row tracking can lead to improved performance of a memory device.

BRIEF DESCRIPTION OF THE DRAWINGS

Implementations of various techniques are described herein with reference to the accompanying drawings. It should be understood, however, that the accompanying drawings illustrate only various implementations described herein and are not meant to limit implementations of various techniques described herein.

DESCRIPTION

In the description that follows, the scope of the term "some implementations" is not to be so limited as to mean more than one implementation, but rather, the scope may include one implementation, more than one implementation, or perhaps all implementations.

Implementations described herein provide a self-timing path for column and row tracking of a bitcell array. The column tracking aspect of the self-timing path tracks the signal slew rate in the wordline signal of the bitcell array, where a dummy wordline is terminated so as not to add an extra RC time constant penalty to column tracking when compared to some prior configurations. With the dummy wordline terminated, active pulldown nMOSFETs (Metal Oxide Semiconductor Field Effect Transistor) on a dummy bitline are configured at the bottom rows of the bitcell array when compared to some prior configurations. Both active pulldown nMOSFETs and dummy pulldown nMOSFETs on the dummy bitline are configured with their source terminals connected to a substrate-connected dummy line to facilitate row tracking.

Figure 1:
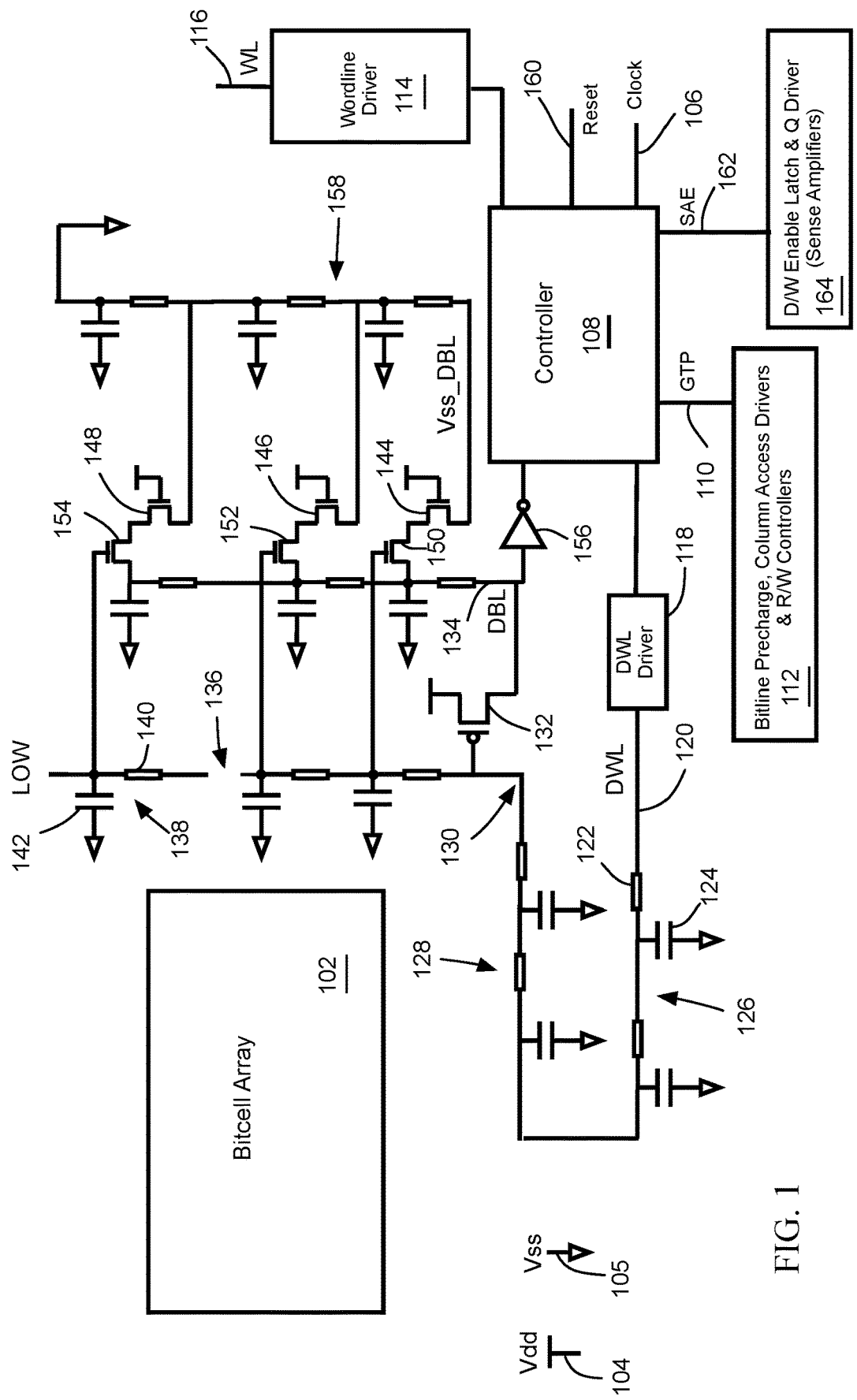
FIG. 1 illustrates a self-timing path in accordance with various implementations described herein.
Figure 2:
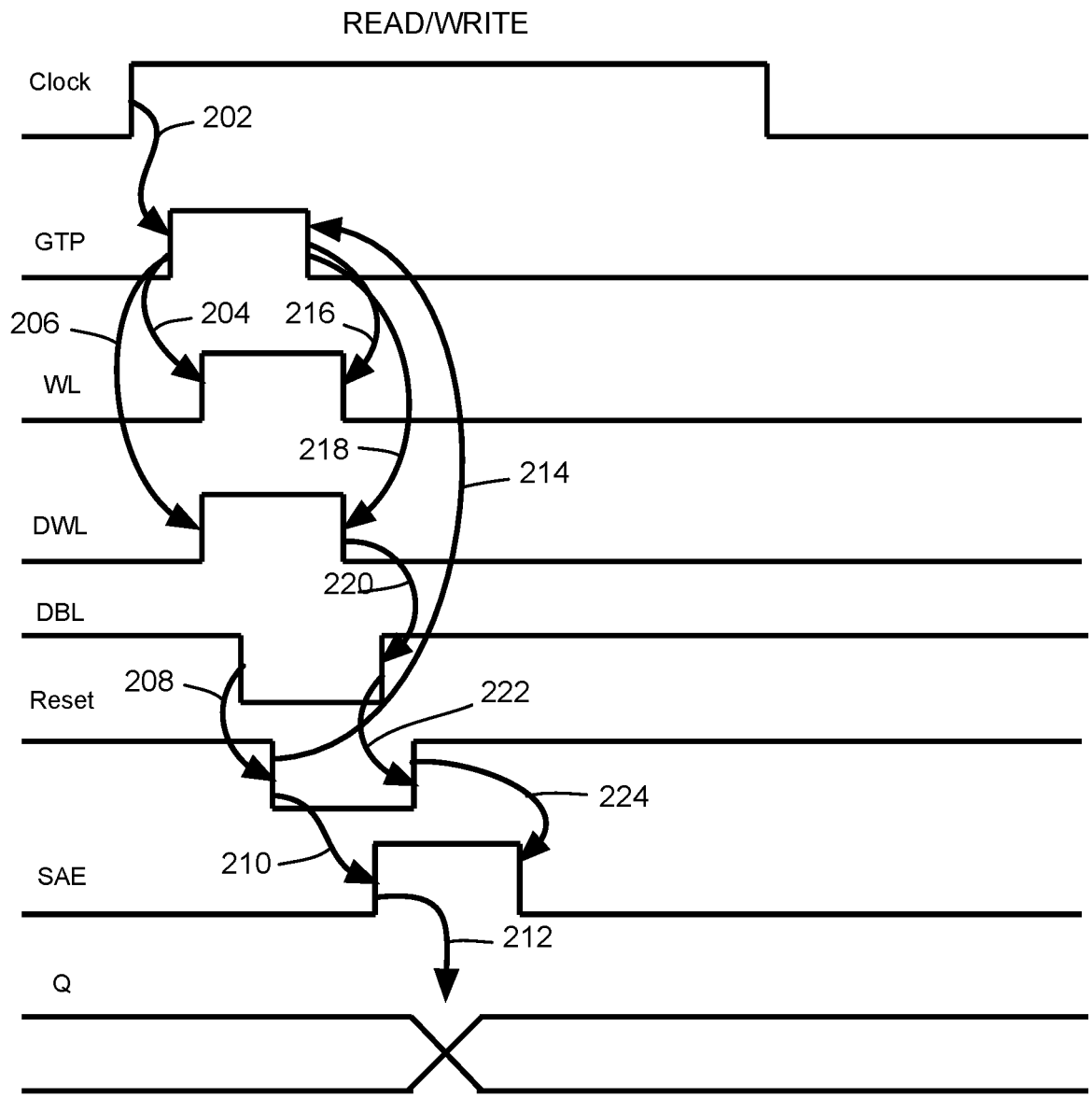
FIG. 2 illustrates the timing of various signals illustrated in a self-timing path in accordance with various implementations described herein.

FIG. 1 illustrates a self-timing path for a bitcell array 102, where the timing of various signals in the self-timing path of FIG. 1 is illustrated in FIG. 2. Referring to FIG. 1, a voltage rail 104 denotes a rail voltage Vdd and a substrate (or ground) 105 denotes a substrate voltage (or ground voltage) Vss. In practice, the rail voltage Vdd represents a logical HIGH, and the substrate voltage Vss represents a logical LOW.

A clock signal 106 is provided to a controller 108, where for example the clock signal 106 is asserted HIGH to begin a read or write operation. This is illustrated by the signal labeled "clock" in FIG. 2. In response to the clock signal 106 being asserted HIGH, the controller 108 asserts an internal clock signal 110, denoted as GTP in FIG. 1 and FIG. 2. The internal clock signal GTP is provided to various functional units to begin a read or write operation, such as precharging bitlines and enabling various column access drivers and read/write controllers, as represented by a functional unit 112 in FIG. 1.

When the controller 108 asserts the GTP internal clock signal, a wordline driver 114 is enabled to assert a wordline (WL) signal 116. The particular wordline asserted depends upon the memory address of the word, where for ease of illustration only one wordline signal is illustrated. A dummy wordline driver 118 is enabled to assert a dummy word line (DWL) signal 120. These signals are illustrated in FIG. 2 and labeled, respectively, as WL and DWL.

As is well known, a transmission line may be modeled as comprising distributed impedance elements. For ease of illustration, several impedance elements are illustrated in the DWL signal 120. It is understood that such impedance elements are not actual components added to an embodiment, but are merely added to FIG. 1 to illustrate modeling of a transmission line. A specific example of such impedance elements is illustrated by an impedance element 122 and a capacitor 124. The impedance element 122 may be modeled as a resistor, so that an RC time constant is represented. The impedance element 122 may also include inductance.

The DWL signal 120 tracks signal propagation delay along the wordlines (column tracking) of the bitcell array 102. Labels 126 and 128 in FIG. 1 point to the folded parts of the DWL signal 120 to track the columns of the bitcell array 102. An arrow 130 points to a turn in the DWL signal 120, where this turn is used to allow tracking of the rows of the bitcell array 102.

When the DWL signal 120 is LOW, a pullup pMOSFET 132 pulls HIGH (pre-charges) a dummy bitline (DBL) signal 134. When the clock signal 106 goes HIGH at the beginning of a read or write operation on the bitcell array 102, the internal clock signal GTP 110 is asserted HIGH, as indicated in the timing diagram of FIG. 2 by a transition 202. As further indicated in FIG. 2 by transitions 204 and 206, the WL signal 116 is asserted HIGH to perform the desired read or write operation on the appropriate memory cells in the bitcell array 102, and the DWL signal 120 is asserted HIGH. With the DWL signal 120 asserted HIGH, the pullup pMOSFET 132 is turned OFF.

The DWL signal 120 provides a wordline signal to a plurality of dummy cells. A dummy cell may comprise an active pulldown nMOSFET or a dummy pulldown nMOSFET. The DWL signal 120 is terminated as indicated by an arrow 136. An arrow 138 denotes a section of signal line that would have been part of the DWL signal in some prior configurations. The section of signal line indicated by the arrow 138 is referred to as a terminated dummy wordline (DWL_T) signal 138. The DWL_T signal 138 is held LOW (Vss). Like the DWL signal 120, the DWL_T signal 138 is modeled as a transmission line with distributed impedance elements. For ease of illustration, impedance elements 140 and 142 are shown.

Terminating the DWL signal 120 helps reduce unwanted RC delay for column tracking. With the DWL signal 120 terminated, active pulldown nMOSFETs are placed among the lower rows of the bitcell array 102, and dummy pulldown nMOSFETs are placed among the higher rows of the bitcell array 102. For ease of illustration, FIG. 1 illustrates three dummy cells, comprising active pulldown nMOSFETs 144 and 146, and a dummy pulldown nMOSFET 148. In practice there can be more than three dummy cells.

Each active and dummy pulldown nMOSFET has its gate held HIGH (Vdd), and its drain terminal coupled to the DBL signal 134 by way of a pass transistor. An active pulldown nMOSFET has its corresponding pass transistor ON with the gate of the pass transistor connected to the DWL signal 120. For example, the dummy cell for the active pulldown nMOSFET 144 includes a pass transistor 150 coupling the drain terminal of the active pulldown nMOSFET 144 to the DBL signal 134, and the gate of the pass transistor 150 is connected to the DWL signal 120. Similarly, the dummy cell for the active pulldown nMOSFET 146 includes a pass transistor 152 coupling the drain terminal of the active pulldown nMOSFET 146 to the DBL signal 134, and the gate of the pass transistor 152 is connected to the DWL signal 120.

A dummy pulldown nMOSFET has its corresponding pass transistor OFF with the gate of the pass transistor connected to the DWL_T signal 138. For example, the dummy cell for the dummy pulldown nMOSFET 148 includes a pass transistor 154 coupling the drain terminal of the dummy pulldown nMOSFET 148 to the DBL signal 134, and the gate of the pass transistor 154 is connected to the DWL_T signal 138. With the DWL_T signal 138 held LOW, the pass transistor 154 is OFF.

A sense amplifier 156 is coupled to the dummy bitline to indicate the voltage or state of the dummy bitline to the controller 108. Each active pulldown nMOSFET is coupled to the DBL signal 134 so that its electrical distance to the sense amplifier 156 is less than the electrical distance of each dummy pulldown nMOSFET to the sense amplifier 156. This may be restated by referring to dummy cells. Each dummy cell having an active pulldown nMOSFET is coupled to the dummy bitline at an electrical distance from the sense amplifier 156 that is less than the electrical distance of each dummy cell with a dummy pulldown nMOSFET to the sense amplifier 156.

To facilitate row tracking of the bitcell array 102, each source terminal of an active pulldown nMOSFET or a dummy pulldown nMOSFET is connected to a signal line that tracks the rows (bitlines) of the bitcell array 102. This signal line is referred to as Vss_DBL signal 158. The Vss_DBL signal 158 is connected to the substrate 105, so that the Vss_DBL signal 158 is terminated at the substrate or ground voltage Vss.

During a read or write operation when the DWL signal 120 is asserted, the pullup pMOSFET 132 is OFF and the active pulldown nMOSFETs eventually pull LOW the DBL signal 134. This in turn causes a reset signal 160 to go LOW, as indicated in FIG. 2 by a transition 208. With the reset signal 160 set LOW, the controller 108 asserts a sense amplifier enable (SAE) signal 162 to enable various sense amplifiers and circuits in the appropriate functional units for reading or writing data to the bitcell array 102, represented by a transition 210 in FIG. 2.

In FIG. 1, a functional unit 164 represents the various circuits that are enabled by the SAE signal 162. For a read operation, after some time delay, valid data is available from the bitcell array 102 as indicated by a transition 212 and a signal labeled Q in FIG. 2.

When the reset signal 160 is de-asserted (pulled LOW) as indicated by transition 208, the controller 108 de-asserts the internal clock signal GTP as indicated by a transition 214, which in turn causes the controller 108 to de-assert the WL signal 116 (transition 216) and the DWL signal 120 (transition 218). With the DWL signal 120 LOW, the pullup pMOSFET 132 is turned ON to pull HIGH the DBL signal 134, indicated by a transition 220. The reset signal 160 is then asserted HIGH (transition 222) and the SAE signal 162 is de-asserted (transition 224).

Figure 3:
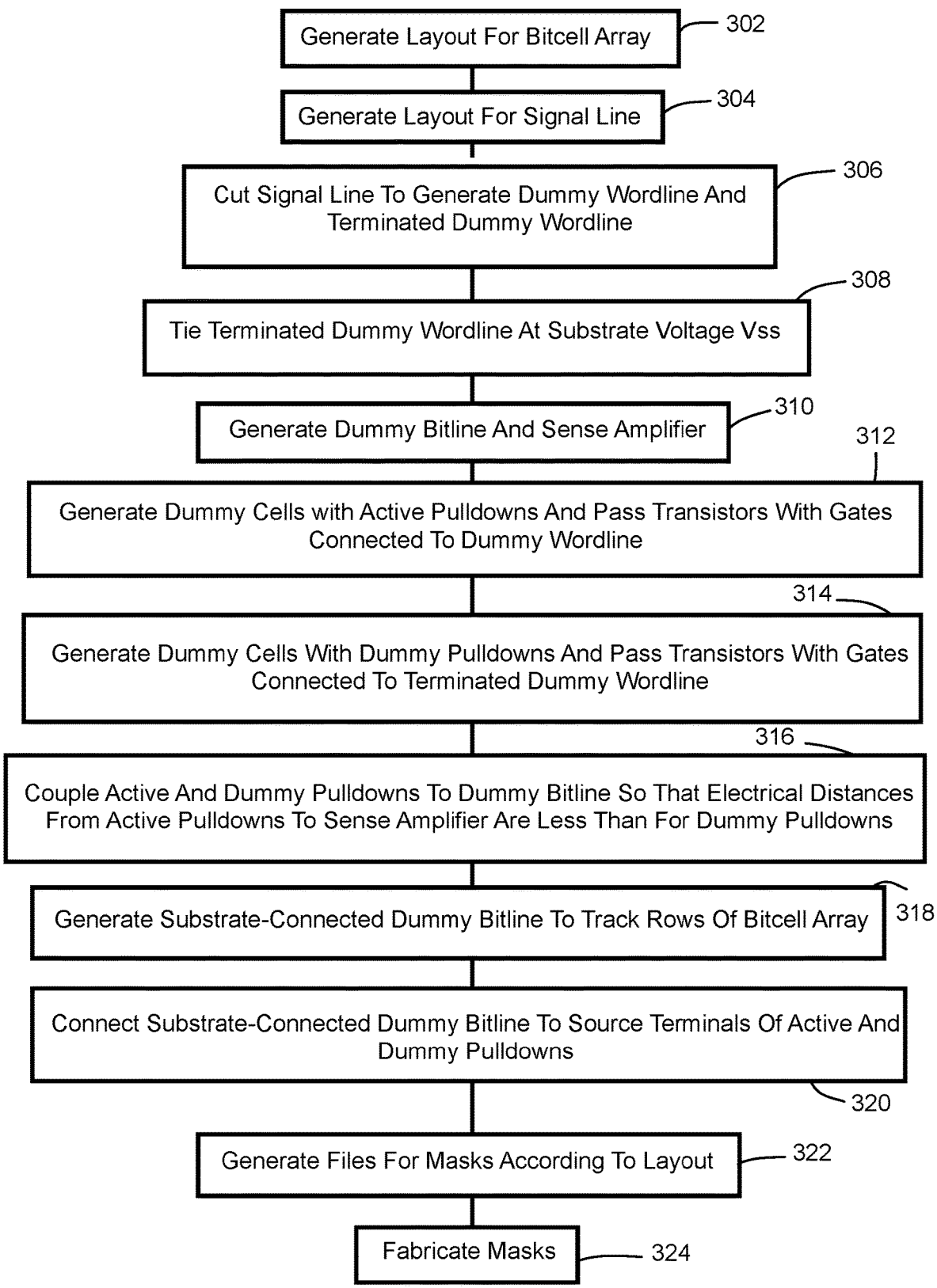
FIG. 3 illustrates a method for circuit design in accordance with various implementations described herein.

FIG. 3 illustrates a method for circuit design. With the exception of the last step illustrated in FIG. 3, all steps are directed to generating one or more files describing a circuit layout and the masks used to fabricate the circuit. The circuit layout is represented by one or data structures. For ease of description, rather than referring to a step as generating a layout for some particular circuit component, it may be convenient to simply refer to the step as generating the circuit component itself, although the step is not a manufacturing step. It is to be understood that generating the circuit component means that a layout is generated, where the layout describes the circuit component to be fabricated.

In step 302, a bitcell array is generated, and in step 304 a signal line is generated, where the signal line is part of a self-timing path as described previously with respect to the embodiments. In step 306 the signal line is cut to generate a dummy word line (DWL) and a terminated dummy word line (DWL_T). In step 308, the terminated dummy word line is held at the substrate or ground voltage Vss. In step 310 a dummy bitline and a sense amplifier for the dummy are generated.

In steps 312 and 314 the dummy cells are generated that will form part of the self-timing path. In step 312, a first type of dummy cell is generated, comprising an active pulldown nMOSFET with a corresponding pass transistor. The gate of the pass transistor is connected to the dummy wordline. In step 314, a second type of dummy cell is generated, comprising a dummy pulldown nMOSFET with a corresponding pass transistor. The gate of the pass transistor is connected to the terminated dummy wordline.

In step 316, the active and dummy pulldown nMOSFETs are coupled to the dummy bitline such that the electrical distances from the active pulldown nMOSFETs to the sense amplifier (generated in step 310) are less than the electrical distances from the dummy pulldown nMOSFETs to the sense amplifier. That is, each dummy cell with an active pulldown nMOSFET is at an electrical distance from the sense amplifier that is less than an electrical distance from the sense amplifier to any dummy cell with a dummy pulldown nMOSFET.

In step 318 a dummy bitline is connected to the substrate, referred to as a substrate-connected dummy bitline. The layout of the substrate-connected dummy bitline is configured to track the rows of the bitcell array. In step 320, the substrate-connected dummy bitline is connected to the source terminals of the active and dummy pulldown nMOSFETs that were generated in steps 312 and 314. In step 322, based upon the circuit layout, files for the masks are generated, and in step 324 the masks are fabricated according to the generated files.

Figure 4:
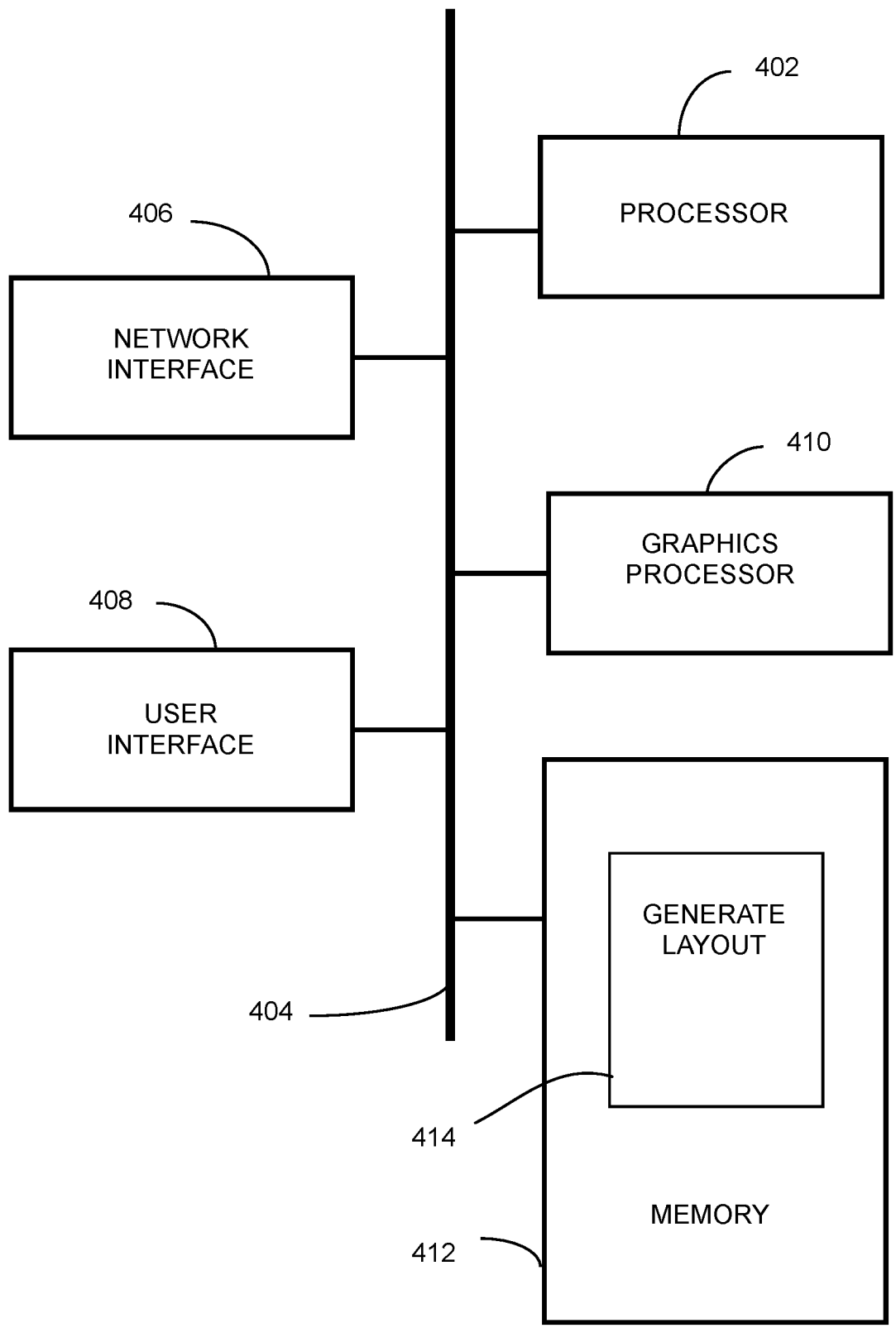
FIG. 4 illustrates a computing platform to implement a method in accordance with various implementations described herein.

Many of the steps illustrated by the process of FIG. 3 may be performed by a programmable computing platform such as that illustrated in FIG. 4. FIG. 4 illustrates a processor 402 coupled by way of an interconnect or bus 404 to various other functional units, such as a network interface 406, a user interface 408, a graphics processor 410, and a system memory 412. The processor 402 represents one or more processors, were each processor comprises one or more processor cores. The system memory 412 may be part of a memory hierarchy, or some components of the memory hierarchy may be embedded on the same chip as the processor 402. Module 414 illustrates instructions stored in the memory 412 that when executed by the processor 402 cause the programmable computing platform of FIG. 4 to perform the circuit layout generation as described with respect to the process of FIG. 3.

It is to be understood in the description of the embodiments that it is a matter of design choice whether a signal is asserted HIGH or de-asserted LOW so as to cause a desired action. It is to be appreciated that the various signals illustrated in FIG. 2 are merely examples of particular embodiments, in that various conventions may be followed as to whether a particular signal is asserted or de-asserted to cause a desired action.

Implementations of various technologies described herein may be operational with numerous general purpose or special purpose computing system environments or configurations. Examples of computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in the general context of computer-executable instructions, such as program modules, being executed by a computer. Program modules include routines, programs, objects, components, data structures, etc. that perform particular tasks or implement particular abstract data types. Further, each program module may be implemented in its own way, and all need not be implemented the same way. While program modules may execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or some combination of both.

The various technologies described herein may be implemented in distributed computing environments where tasks are performed by remote processing devices that are linked through a communications network, e.g., by hardwired links, wireless links, or various combinations thereof. In a distributed computing environment, program modules may be located in both local and remote computer storage media including, for example, memory storage devices and similar.

Further, the discussion provided herein may be considered directed to certain specific implementations. It should be understood that the discussion provided herein is provided for the purpose of enabling a person with ordinary skill in the art to make and use any subject matter defined herein by the subject matter of the claims. It should be intended that the subject matter of the claims not be limited to the implementations and illustrations provided herein, but include modified forms of those implementations including portions of implementations and combinations of elements of different implementations in accordance with the claims. It should be appreciated that in the development of any such implementation, as in any engineering or design project, numerous implementation-specific decisions should be made to achieve developers' specific goals, such as compliance with system-related and business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

Described herein are various implementations of a circuit comprising: a substrate; a dummy wordline; a dummy bitline; and at least one dummy cell of a first type. Each dummy cell of the first type comprises: an active pulldown nMOSFET having a gate terminal, a source terminal, and a drain terminal; and a pass nMOSFET having a gate connected to the dummy wordline, a first source terminal connected to the drain terminal of the active pulldown nMOSFET, and a drain terminal connected to the dummy bitline; and the circuit comprises a substrate-connected dummy bitline coupled to the source terminal of each active pulldown nMOSFET and coupled to the substrate.

Described herein are various implementations of a method comprising: generating a layout for a memory circuit; generating the layout to include a signal line; generating the layout to indicate a cut in the signal line to generate a dummy wordline and a terminated dummy wordline, where the terminated dummy wordline is connected to a substrate; and fabricating at least one mask to fabricate the memory circuit according to the layout. Generating the layout for the memory circuit further comprises generating data structures to represent: a dummy bitline; at least one dummy cell of a first type, each dummy cell of the first type comprising: an active pulldown nMOSFET having a gate terminal, a source terminal, and a drain terminal; a pass nMOSFET having a gate terminal connected to the dummy wordline, a first source terminal connected to the drain terminal of the active pulldown nMOSFET, and a drain terminal connected to the dummy bitline; and a substrate-connected dummy bitline coupled to the source terminal of each active pulldown nMOSFET and coupled to the substrate.

Described herein are various implementations of a circuit comprising: a substrate; a bitcell array including bitlines and wordlines; a dummy bitline to track the bitlines of the bitcell array; a dummy wordline to track the wordlines of the bitcell array; a pass nMOSFET having a gate terminal connected to the dummy wordline, a drain terminal connected to the dummy bitline, and a source terminal; an active pulldown nMOSFET comprising a gate terminal, a source terminal, and a drain terminal coupled to the source terminal of the pass nMOSFET; a supply rail coupled to the gate terminal of the active pulldown nMOSFET; and a substrate-connected dummy bitline to track the bitlines of the bitcell array, wherein the substrate-connected dummy bitline is coupled to the source terminal of the active pulldown nMOSFET.

Reference has been made in detail to various implementations, examples of which are illustrated in the accompanying drawings and figures. Numerous specific details are set forth to provide a thorough understanding of the disclosure provided herein. However, the disclosure provided herein may be practiced without these specific details. In some other instances, well-known methods, procedures, components, circuits, and networks have not been described in detail so as not to unnecessarily obscure details of the implementations.

If one or more circuits are used to realize some or all instances of an implementation, reference may be made to a node or terminal of a circuit or circuit element as an input port or an output port. For a circuit in which a port is a two terminal structure (e.g., circuits modeled as lumped-parameter systems), a recited node or terminal forms one terminal of the two terminal structure, where it is understood that a ground rail (or substrate) serves as another terminal of the two terminal structure.

It should also be understood that, although the terms first, second, etc. may be used herein to describe various elements, these elements should not be limited by these terms. These terms are only used to distinguish one element from another. For example, a first element could be termed a second element, and, similarly, a second element could be termed a first element. The first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised in accordance with the disclosure herein, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described herein are disclosed as example forms of implementing the claims.

What is claimed is:

1. A circuit comprising:
   a controller;
   a dummy wordline that is cut into a first part and a second part that is electrically isolated from the first part, wherein the first part is coupled to the controller, and wherein the second part is continuously electrically isolated from the controller;
   a dummy bitline coupled to the controller;
   a pMOSFET having a gate coupled to the first part of the dummy wordline, a source coupled to a supply rail, and a drain coupled to the dummy bitline;
   at least one dummy cell of a first type, each dummy cell of the first type comprising:
      a two transistor (2T) dummy cell;
      a single active pulldown nMOSFET having a gate coupled to the supply rail, a source coupled to ground, and a drain; and
      a first pass nMOSFET having a gate coupled to the first part of the dummy wordline, a source coupled to the drain of the active pulldown nMOSFET, and a drain coupled to the dummy bitline; and
   at least one dummy cell of a second type, each dummy cell of the second type comprising:
      a single dummy pulldown nMOSFET having a gate coupled the supply rail, a source coupled to ground, and a drain; and
      a second pass nMOSFET having a gate coupled to the second part of the dummy wordline, a source coupled to the drain of the dummy pulldown nMOSFET, and a drain coupled to the dummy bitline;
   a dummy wordline driver coupled to the first part of the dummy wordline between the controller and the gate of the pMOSFET, wherein the dummy wordline driver is also coupled to the first part of the dummy wordline between the controller and the gate of the pass nMOSFET of each dummy cell of the first type, and wherein the dummy wordline driver is electrically isolated from the second part of the dummy wordline;
   wherein the controller provides a sense amplifier enable (sae) signal to sense amplifier circuitry when the active pulldown nMOSFET de-asserts the dummy bitline.

2. The circuit as set forth in claim 1, wherein:
   the second part of the dummy wordline refers to a terminated dummy wordline that is coupled to ground.

3. The circuit as set forth in claim 2, wherein:
   the supply rail is coupled to the gate of each active pulldown nMOSFET and each dummy pulldown nMOSFET.

4. The circuit as set forth in claim 2, wherein the terminated dummy wordline is electrically isolated from the first part of the dummy wordline.

5. The circuit as set forth in claim 2, further comprising:
   a sense amplifier inverter coupled to the dummy bitline, wherein each dummy cell of the first type is coupled to the dummy bitline at an electrical distance from the sense amplifier inverter that is less than an electrical distance of each dummy cell of the second type to the sense amplifier inverter.

6. The circuit as set forth in claim 5, wherein:
   the supply rail is coupled to the gate of each active pulldown nMOSFET and each dummy pulldown nMOSFET.

7. The circuit as set forth in claim 6, further comprising:
   a bitcell array having bitlines; and
   sense amplifier circuitry having latches to latch voltages on the bitlines during a read operation on the bitcell array,
   wherein the controller is coupled to the sense amplifier inverter, the dummy wordline driver, and the latches of the sense amplifier circuitry,
   wherein during a read operation on the bitcell array the controller enables the latches of the sense amplifier circuitry when the sense amplifier inverter indicates that the dummy bitline is LOW.

8. The circuit as set forth in claim 7, wherein before a read operation is performed on the bitcell array, the controller causes the dummy wordline driver to pull down the dummy wordline to LOW.

9. The circuit as set forth in claim 7, wherein
the bitcell array includes wordlines;
the dummy wordline tracks the wordlines of the bitcell array; and
the dummy bitline tracks the bitlines of the bitcell array.

10. The circuit as set forth in claim 1, further comprising:
a bitcell array including wordlines and bitlines, wherein the dummy wordline tracks the wordlines of the bitcell array.

11. The circuit as set forth in claim 10, wherein the dummy bitline tracks the bitlines of the bitcell array.

12. The circuit as set forth in claim 1, wherein when the dummy wordline is asserted, the pMOSFET is deactivated and the active pulldown nMOSFET de-asserts the dummy bitline.

13. The circuit as set forth in claim 1, wherein the controller asserts the sae signal to enable the sense amplifier circuitry for reading data or writing data to a bitcell array.

14. A circuit comprising:
a bitcell array including bitlines and wordlines;
a dummy bitline that tracks the bitlines of the bitcell array;
a dummy wordline that tracks the wordlines of the bitcell array, wherein the dummy wordline has a cut opening that electrically isolates a first part from a second part, and wherein the second part is coupled to ground;
a two transistor (2T) dummy cell having a pass nMOSFET and a single active pulldown nMOSFET, wherein the pass nMOSFET has a gate coupled to the first part of the dummy wordline, a drain coupled to the dummy bitline, and a source, and wherein the active pulldown nMOSFET has a gate coupled to a supply rail, a source coupled to ground, and a drain coupled to the source of the pass nMOSFET;
a pMOSFET having a gate coupled to the first part of the dummy wordline, a source coupled to the supply rail, and a drain coupled to the dummy bitline;
a controller coupled to the dummy bitline and the first part of the dummy wordline, wherein the controller is electrically isolated from the second part of the dummy wordline, wherein the controller provides a sense amplifier enable (sae) signal to sense amplifier circuitry when the active pulldown nMOSFET de-asserts the dummy bitline; and
a dummy wordline driver coupled to the first part of the dummy wordline between the controller and the gate of the pMOSFET, wherein the dummy wordline driver is also coupled to the first part of the dummy wordline between the controller and the gate of the pass nMOSFET, and wherein the dummy wordline driver is electrically isolated from the second part of the dummy wordline.

15. The circuit as set forth in claim 14, wherein the pMOSFET has the drain directly coupled to the dummy bitline.

16. The circuit as set forth in claim 14, wherein when the dummy wordline is asserted, the pMOSFET is deactivated and the active pulldown nMOSFET de-asserts the dummy bitline.

17. The circuit as set forth in claim 14, wherein the controller asserts the sae signal to enable the sense amplifier circuitry for reading data or writing data to a bitcell array.

18. A circuit comprising:
a dummy bitline;
a dummy wordline having a first part and a second part that is electrically isolated from the first part;
a pull-up transistor coupled between a supply rail and the dummy bitline, the pull-up transistor having a gate coupled to the first part of the dummy wordline;
a first dummy cell having a first active pulldown transistor and a first pass transistor coupled in series between the dummy bitline and ground, the first active pulldown transistor having a gate coupled to the supply rail, and the first pass transistor having a gate coupled to the first part of the dummy wordline;
a second dummy cell having a second active pulldown transistor and a second pass transistor coupled in series between the dummy bitline and ground, the second active pulldown transistor having a gate coupled to the supply rail, and the second pass transistor having a gate coupled to the second part of the dummy wordline; and
a dummy wordline driver coupled to the first part of the dummy wordline, wherein the dummy wordline driver is electrically isolated from the second part of the dummy wordline.

19. The circuit as set forth in claim 18, wherein the dummy wordline has a cut opening that electrically isolates the first part from the second part.

20. The circuit as set forth in claim 18, wherein the second part of the dummy wordline refers to a terminated dummy wordline that is coupled to ground.

21. The circuit as set forth in claim 18, wherein:
the pull-up transistor refers to a pMOSFET having a gate coupled to the first part of the dummy wordline, a source coupled to the supply rail, and a drain coupled to the dummy bitline.

22. The circuit as set forth in claim 18, wherein:
the first active pulldown transistor refers to a first active pulldown nMOSFET having a gate coupled to the supply rail, a source coupled to ground, and a drain, and
the first pass transistor refers to a pass nMOSFET having a gate coupled to the first part of the dummy wordline, a source coupled to the drain of the first active pulldown nMOSFET, and a drain coupled to the dummy bitline.

23. The circuit as set forth in claim 18, wherein:
the second active pulldown transistor refers to a second active pulldown nMOSFET having a gate coupled to the supply rail, a source coupled to ground, and a drain, and
the second pass transistor refers to a second pass nMOSFET having a gate coupled to the second part of the dummy wordline, a source coupled to the drain of the second active pulldown nMOSFET, and a drain coupled to the dummy bitline.

24. The circuit as set forth in claim 18, further comprising:
a controller coupled to the first part of the dummy wordline, wherein the second part is electrically isolated from the controller.

25. The circuit as set forth in claim 24, wherein:
the dummy wordline driver is coupled to the first part of the dummy wordline between the controller and the gate of the pull-up transistor, and
the dummy wordline driver is also coupled to the first part of the dummy wordline between the controller and the gate of the first pass transistor of the first dummy cell.

26. The circuit as set forth in claim 24, wherein:
the controller provides a sense amplifier enable (sae) signal to sense amplifier circuitry when the first active pulldown transistor de-asserts the dummy bitline.

* * * * *